United States Patent Office 3,086,957
Patented Apr. 23, 1963

3,086,957
HALOGENATED ETHYLENE POLYMER COMPOSITIONS AND METHOD FOR PREPARING SAME
Randall W. Carter, Nashville, Tenn., assignor to Phillips Petroleum Company, a corporation of Delaware
No Drawing. Filed Jan. 30, 1958, Ser. No. 712,082
3 Claims. (Cl. 260—45.5)

This invention relates to novel compositions of matter comprising halogenated polymers of ethylene blended with polymers of ethylene. In one aspect, it relates to a method for producing a modified chlorinated polymer of ethylene having outstanding properties, particularly as regard the 100 percent modulus of the modified polymer.

It has recently been discovered, as disclosed in the copending U.S. patent application of J. P. Hogan and R. L. Banks, Serial No. 573,877, filed March 26, 1956, now U.S. 2,825,721, that unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia and thoria.

The ethylene polymers produced in accordance with the Hogan and Banks process are high density, highly crystalline solid polymers. The polymers have an inherent viscosity of at least 0.8, preferably an inherent viscosity between 1.2 and about 10, as determined from a solution of 0.2 gram of polymer in 50 ccs. of tetralin at 130° C. The polymers also have a crystallinity of at least 70 percent, preferably at least 80 percent, and more desirably at least 90 percent, at 25° C. The crystallinity of the polymers can be determined by measurements of nuclear magnetic resonance (Wilson and Pake, Journal of Polymer Science 10, 503 (1953)), using a sample of polymer which is in a state approaching equilibrium at 25° C. An approach to this equilibrium state can be achieved by heating the polymer sample to a temperature about 50° C. above its crystalline melting point, maintaining the sample at this temperature for about one hour, and then cooling to 25° C. at a rate characterized by fall of about 1.5° C. per minute at 135° C. The crystallinity can also be determined according to the method of Matthews, Peiser and Richards, Acta Crystallographica 2, 85 (1949). The softening point of the polymer will vary with the particular polymer used, increasing as the density and crystallinity of the polymer increases. Generally, the softening point of the highly crystalline, ethylene polymer is above about 250° F., preferably in the approximate range of 250 to 300° F., and is several degrees, e.g., about 10° F., higher than the melting point of the polymer. The term "polymer of ethylene" as used herein is intended to include polymers obtained by polymerizing ethylene and mixtures of ethylene and minor amounts of other unsaturated hydrocarbons, e.g., monoolefins containing up to and including 8 carbon atoms per molecule. It has been found that superior halogenated products can be obtained by utilizing as the starting material polymers prepared in accordance with the Hogan and Banks process. This invention is concerned with the production of modified halogenated polymers which posses outstanding physical properties, particularly as regards the 100 percent modulus of the polymer.

It is an object of this invention to provide a novel composition of matter comprising a halogenated polymer of ethylene and a solid polymer of ethylene.

Another object of the invention is to provide a method for producing a modified halogenated polymer of ethylene.

Other and further objects and advantages of the invention will become apparent to those skilled in the art upon consideration of the following disclosure.

The instant invention resides in a novel modified halogenated polymer and in a process for producing such a polymer. Broadly speaking, the composition of matter of this invention comprises a halogenated polymer of ethylene and a solid polymer of ethylene, the halogenated polymer being prepared from, and the solid polymer being, a polymer having an inherent viscosity of at least 0.8, a density of at least 0.94 at 25° C. and a crystallinity of at least 70 percent at 25° C. While the instant invention is particularly applicable to ethylene polymers produced in accordance with the aforementioned Hogan and Banks process, any ethylene polymer having the above-described properties can be used in the practice of this invention. Such polymers can also be obtained by proceeding in accordance with the processes disclosed by J. A. Reid in copending U.S. patent application Serial No. 494,281, filed March 14, 1955, now abandoned, and by H. D. Lyons and Gene Nowlin in copending U.S. patent application Serial No. 495,054, filed March 17, 1955. As disclosed in the first of these patent applications, a solid polymer of ethylene can be produced by contacting ethylene with a catalyst comprising a mixture of an organometallic compound, such as a trialkyl aluminum, and a halide of a metal of group IV of the periodic table, such as titanium tetrachloride. As disclosed in the latter of the aforementioned patent applications, a solid polymer of ethylene can be obtained by carrying out the ploymerization in the presence of a catalyst comprising an organometallic halide, such as ethylaluminum dichloride, and a halide of a group IV metal, such as titanium tetrachloride.

While the halogenation of the ethylene polymer can be carried out with the polymer in suspension, it is preferred to accomplish the halogenation with the polymer in solution in a halogenated solvent. The copending U.S. patent applications of P. J. Canterino, Serial No. 442,891, filed July 12, 1954, and P. J. Canterino and J. N. Baptist, Serial No. 446,666, filed July 29, 1954, now U.S. 2,920,064, describe methods whereby the high density, crystalline polymer can be halogenated in homogeneous solution to obtain useful products which are uniform in character and relatively stable thermally. The conditions of the halogenation depend upon a specific type of procedure utilized, but the temperature generally is in the range of 10 to 150° C. (50 to 302° F.) while the pressure need only be sufficient to maintain the solvent substantially in the liquid phase. In solution halogenation, the polymer is halogenated while being maintained in solution in the halogenated solvent at a temperature above the normal boiling point of the solvent and below the temperature at which the polymer begins to decompose and at a superatmospheric pressure sufficient to maintain the solvent in liquid phase. For example, when using carbon tetrachloride as a solvent, the halogenation takes place at a temperature of above about 80° C. (176° F.), e.g., between 95 and 130° C. (203 and 246° F.), using a pressure sufficient to maintain the solvent in the liquid phase at this temperature. When the halogenation has been continued until the polymer contains at least 15 weight percent, e.g., between 15 and 25 weight percent, chemically combined halogen, further halogenation can be effected at atmospheric pressure and temperatures ranging from about 25° C. (77° F.) to the reflux temperature of the mixture or about 60° C. (140° F.). When suspension halogenation is employed, temperatures above 80° C. are used, the pressure in this method also being sufficient to maintain the solvent in the liquid phase. Another halogenation method which can be advantageously used is described in detail in the copending U.S. patent application of P. J. Canterino, Serial No. 700,591, filed December 4, 1957. In accordance with this latter method, halogenation of the high density, crystalline polymers is carried out in two stages. In the first stage, the polymer is halogenated in solution in the solvent so as to obtain a partially halogenated polymer containing up to about 20 weight percent chemically combined halogen. The solution is then cooled to a temperature sufficient to precipitate substantially all of the partially halogenated polymer after which the resulting precipitated polymer dispersed in the solvent is halogenated so as to obtain a more highly halogenated polymer. In suspension halogenation and in the suspension halogenation stage of the two-stage halogenation method described in the aforementioned Canterino application, temperatures as low as 10° C. (50° F.) can be utilized.

While it is preferred to use chlorinated polymers of ethylene in the practice of the instant invention, other halogenated polymers of ethylene are also applicable. Thus, elemental halogens other than elemental chlorine, such as bromine and iodine, can be employed in producing the halogenated polymer. Furthermore, compounds such as iodine chlorides, which furnish these halogens, can be used as halogenating agents in preparing the halogenated polymers. The halogenation, or the preferred chlorination, is preferably carried out in the presence of a catalyst. Thus, the zone in which the halogenation is carried out can be irradiated with sunlight or artificial light, e.g., ultraviolet light. Other suitable catalysts include peroxides and hydroperoxides, e.g., benzoyl peroxide, diisopropylbenzene hydroperoxide and cumene hydroperoxide, and azo compounds, particularly those having cyano groups on the carbon atoms, alpha to the azo nitrogen atoms, such as dimethyl and diethyl alpha,alpha'-azodiisobutyrate, alpha,alpha'-azodiisobutyronitrile, and alpha,alpha'-azo(bis)alpha,gamma - dimethylvaleronitrile.

The halogenated ethylene polymers used in the practice of this invention can contain only a small amount, e.g., 5 weight percent or less, of chemically combined halogen up to the theoretical amount of halogen which can be introduced into the polymer. In the case of the preferred chlorinated polymers, the polymer can theoretically contain about 85 weight percent chlorine. The halogenated polymers preferably contain between 10 and 70 weight percent of chemically combined halogen. It is to be understood also that blends of two or more halogenated ethylene polymers containing different amounts of halogen can be blended with the solid ethylene polymer so as to obtain the novel composition of this invention. Thus, a polymer having a low chlorine content, e.g., 10 to 30 weight percent, can be advantageously blended with a polymer having a high chlorine content, e.g., in excess of 40 weight percent, so as to provide a blend of chlorinated polymers which is thereafter blended with the solid ethylene polymer.

It has been found that an improvement in the 100 percent modulus of the halogenated ethylene polymer can be obtained by blending only a small amount of the solid ethylene polymer with the halogenated product. It is usually preferred to use at least 5 weight percent solid polyethylene in the composition, the maximum amount of polyethylene employed being 50 weight percent, both values based upon the total composition. Blends of chlorinated polyethylene and solid polyethylene having such a composition have a 100 percent modulus in the approximate range of 500 to 1600 p.s.i.

Blending of the halogenated polymer with the solid polymer can be accomplished by many suitable means such as on a roll mill or in a Banbury mixer. The blending is carried out at a temperature above the softening points of the polymers, temperatures in the range of about 300 to 500° F. being commonly preferred. The blending can also be accomplished by mixing solutions of the polymers in a vessel provided with means for agitation or the like, the mixing of the materials being continued until a homogeneous composition is obtained. The polymer blend can be recovered by precipitating it from solution by cooling, or the solvent can be vaporized. When proceeding in this manner, the solutions used can advantageously be the same ones employed in the process for preparing the polymers. Minor amounts of pigments or dyes, fillers, and antioxidants can be admixed with the polymers prior to or during the blending operation. Examples of such materials include titanium dioxide, clay, asbestos, and 2-hydroxy-4-methoxybenzophenone.

A more complete understanding of the invention can be obtained by referring to the following illustrative example which is not intended, however, to be unduly limitative of the invention.

EXAMPLE

Ethylene was polymerized in a continuous process in a 60 gallon reactor in the presence of a chromium oxide-silica-alumina catalyst containing 2.5 percent chromium as chromium oxide. Cyclohexane was employed as the solvent for the reaction. Prior to its use in the polymerization, the catalyst was activated in air by being subjected to gradually increasing temperatures up to 950° F. The reaction conditions are set forth hereinbelow in Table I.

*Table I*

| | |
|---|---:|
| Reaction temperature, ° F. | 290 |
| Pressure, p.s.i.g. | 420 |
| Catalyst concentration, wt. percent | 0.09 |
| Polymer concentration, wt. percent | 9.0 |
| Cyclohexane feed rate, lb./hour | 200 |
| Ethylene feed rate, s.c.f.h. | 33 |

The polymer product obtained had the properties set forth hereinbelow in Table II.

*Table II*

| | |
|---|---:|
| Density, gm./cc. at room temperature | 0.96 |
| Melting point, ° F. | 253±2 |
| Crystallinity, percent | Above 92 |
| Tensile strength, p.s.i.g. [1] | 4700 |
| Elongation, percent [2] | 28 |
| Flex temperature, ° F. [3] | 79 |
| Stiffness, p.s.i. [4] | 145,000 |
| Melt index [5] | 0.6–0.8 |

[1] ASTM D412–51T.
[2] ASTM D412–51T.
[3] ASTM D1043–51.
[4] ASTM D747–50.
[5] ASTM D1238–52T.

This high density, crystalline polymer of ethylene was chlorinated in solution in carbon tetrachloride according to the following procedure. A 2.1 pound sample of the polyethylene was dissolved in 55 pounds of carbon tetrachloride contained in a 5-gallon, glass-lined vessel provided with a stirrer by heating to a temperature of 225° F. The polyethylene solution was then chlorinated at a temperature in the range of 206 to 210° F. and at a pressure of 44 p.s.i. In this chlorination, 1.5 pounds of chlorine was added at a constant rate over a period of 2.5 hours. At the end of this time, the residual hydrochloric acid was removed by slowly venting the reactor until the pressure therein was reduced to atmospheric pressure. The solution of the chlorinated polyethylene was then transferred to a 10-gallon vessel and diluted with approximately 1 gallon of carbon tetrachloride which had been used to rinse the glass-lined reactor. The solution was filtered through a 60-mesh screen, and the polymer therein was coagulated by pouring the solution into about 3 gallons of isopropyl alcohol. The polymer was recovered by filtration and then soaked overnight in 2 gallons of isopropyl alcohol. Finally, the polymer was filtered and dried at 160° F.

The chlorinated polyethylene, which was found to contain 24 weight percent chlorine, was a flexible, rubbery product. The value of 24 weight percent chlorine, which was determined for the chlorinated product, agrees very closely with the value of 25 weight percent which was computed from the weight of the starting material and the chlorine added to the reactor.

Several blends were prepared of the above-described chlorinated polyethylene and a polyethylene. The polyethylene employed was prepared by polymerizing ethylene in the presence of a chromium oxide-silica-alumina catalyst and had properties similar to the polyethylene used as a starting material in the preparation of the chlorinated polymer. In preparing the blends, the polyethylene was first milled at a temperature of 315° F., after which the chlorinated polymer and a stabilizer (3 parts by weight of Ferro 541A per 100 pounds of polymer) were added to the polyethylene. After milling these materials for 5 minutes, the blend was partially cooled on the mill and then removed. When the blend had cooled to room temperature, it was chopped up to give a granular product which was used to prepare the compression molded specimens employed in the tests for determining properties of the blend.

A description of the blends of the chlorinated polyethylene with the solid polyethylene and physical properties of the materials are set forth hereinbelow in Table III.

*Table III*

| Test No. | 1 | 2 | 3 | 4 | 5 | 6 | 7 | 8 |
|---|---|---|---|---|---|---|---|---|
| Composition of Blend, percent: | | | | | | | | |
| Chlorinated Polymer [1] | 100 | 92 | 84 | 75 | 67 | 60 | 50 | 0 |
| Polyethylene | 0 | 8 | 16 | 25 | 33 | 40 | 50 | 100 |
| Density, gm./cc. | 1.062 | 1.069 | 1.061 | 1.049 | 1.043 | 1.030 | | 0.96 |
| 100% Modulus, p.s.i. [2] | 400 | 547 | 584 | 846 | 1,069 | 1,412 | 1,569 | ([3]) |
| Tensile Strength, p.s.i. [2] | 2,400 | 2,090 | 1,870 | 1,850 | 1,423 | 1,578 | 1,905 | 4,700 |

[1] The chlorinated polymer contained 24 percent by weight of chlorine.
[2] ASTM D412-51T (Die C, rate of pull of 20 inches a minute).
[3] No value since elongation is considerably less than 100% for polyethylene.

The data in Table III show that the 100 percent modulus of the chlorinated polymer is increased from a value of 400 p.s.i. to a value of 1569 p.s.i. by blending the chlorinated polymer of ethylene with the solid polyethylene. Although the 100 percent modulus is increased nearly 4 times, there is only a relatively small reduction in the tensile strength of the polymer.

The novel compositions of this invention can, in general, be used in applications requiring plastic materials. They are particularly useful in forming molded objects, such as bottles and other containers, because of the high value of the 100 percent modulus of the compositions.

It will be apparent that many modifications and variations of the instant invention can be made by those skilled in the art. Such variations and modifications are believed to come within the spirit and scope of the foregoing disclosure.

I claim:

1. A composition of matter consisting essentially of a solid chlorinated polymer of ethylene containing from about 10 to 70 weight percent chemically combined chlorine and between 5 and 50 weight percent, based on the total weight of polymer, of a solid polymer of ethylene, said chlorinated polymer being produced from, and said solid polymer being, a polymer having an inherent viscosity of at least 0.8 as measured in tetralin at 130° C., a density of at least 0.94 at 25° C. and a crystallinity of at least 80 percent at 25° C., said composition having a 100 percent modulus in the range of 500 to 1600 p.s.i.

2. A composition according to claim 1 wherein said polymer of ethylene is polyethylene having a density of 0.96 and wherein said chlorinated polymer contains about 24 percent chlorine.

3. A method for producing a modified chlorinated polymer of ethylene having an improved 100 percent modulus property which comprises adding up to about 50 weight percent, based on the total weight of polymer product, of a solid polymer of ethylene to a solid chlorinated polymer of ethylene containing from about 10 to 70 weight percent chemically combined chlorine, said chlorinated polymer being produced from, and said solid polymer being, a polymer having an inherent viscosity of at least 0.8 as measured in tetralin at 130° C., a density of at least 0.94 at 25° C., and a crystallinity of at least 80 percent at 25° C., mixing said chlorinated polymer and said solid polymer at a temperature above the softening points of said polymers, cooling the resulting mixture to about room temperature, and recovering a homogeneous polymer product having a 100 percent modulus in the range of 500 to 1600 p.s.i.

References Cited in the file of this patent

UNITED STATES PATENTS

| | | |
|---|---|---|
| 2,369,471 | Latham | Feb. 13, 1945 |
| 2,398,803 | Myles et al. | Apr. 23, 1946 |
| 2,681,324 | Hochberg | June 15, 1954 |
| 2,691,647 | Field | Oct. 12, 1954 |
| 2,692,258 | Roebuck | Oct. 19, 1954 |
| 2,825,721 | Hogan et al. | Mar. 4, 1958 |
| 2,827,444 | Cines | Mar. 18, 1958 |
| 2,920,064 | Baptist et al. | Jan. 5, 1960 |